United States Patent
Stibel

(10) Patent No.: US 8,898,786 B1
(45) Date of Patent: Nov. 25, 2014

(54) INTELLIGENT COMMUNICATION SCREENING TO RESTRICT SPAM

(71) Applicant: Credibility Corp., Malibu, CA (US)

(72) Inventor: Jeffrey M. Stibel, Malibu, CA (US)

(73) Assignee: Credibility Corp., Malibu, CA (US)

(*) Notice: Subject to any disclaimer, the term of this patent is extended or adjusted under 35 U.S.C. 154(b) by 0 days.

(21) Appl. No.: 14/168,886

(22) Filed: Jan. 30, 2014

Related U.S. Application Data

(60) Provisional application No. 61/871,794, filed on Aug. 29, 2013.

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *H04L 12/58* | (2006.01) | |
| *H04L 29/06* | (2006.01) | |
| *G06F 21/55* | (2013.01) | |
| *H04L 29/08* | (2006.01) | |
| *G06F 21/57* | (2013.01) | |

(52) U.S. Cl.
CPC ............ *H04L 51/12* (2013.01); *H04L 63/00* (2013.01); *G06F 21/55* (2013.01); *H04L 63/1425* (2013.01); *H04L 63/1408* (2013.01); *H04L 63/145* (2013.01); *H04L 67/306* (2013.01); *H04L 12/585* (2013.01); *G06F 21/577* (2013.01); *H04L 63/1441* (2013.01); *H04L 63/1416* (2013.01)
USPC ............................................. 726/23; 726/25

(58) Field of Classification Search
CPC ..... H04L 51/12; H04L 63/145; H04L 67/306; H04L 63/1408; H04L 63/1416; H04L 63/1425; H04L 63/1441; H04L 12/585; G06F 21/55; G06F 21/577
USPC .......................................................... 726/23
See application file for complete search history.

(56) References Cited

U.S. PATENT DOCUMENTS

| | | | |
|---|---|---|---|
| 5,329,578 A | 7/1994 | Brennan et al. | |
| 6,728,360 B1 | 4/2004 | Brennan | |
| 7,290,035 B2 * | 10/2007 | Mattathil | ...................... 709/206 |
| 7,443,964 B2 | 10/2008 | Urban et al. | |
| 7,463,727 B2 | 12/2008 | Urban et al. | |

(Continued)

FOREIGN PATENT DOCUMENTS

| | | | |
|---|---|---|---|
| WO | WO 2012129154 A2 * | 9/2012 | |
| WO | WO 2012159055 A3 * | 1/2013 | |

*Primary Examiner* — Dede Zecher
(74) *Attorney, Agent, or Firm* — Los Angeles Patent Group; Arman Katiraei

(57) ABSTRACT

A system is provided to restrict the ability of a spammer to freely contact an entity over a communication channel. To do so, the system reconfigures a communication channel used to contact the target entity such that the system can intercept a communication from a source contacting entity en route to the target entity. The system extracts an identifier (e.g., contacting entity's telephone number) from the communication and uses the identifier to query a database storing information about the contacting entity. The information reveals the contacting entity's industry, occupation, credibility, etc. From this information, the system automatically identifies the contacting entity as a spammer, potential spammer, or non-spammer. The system performs a default screening of the communication based on the classification. Alternatively, the target contacted entity can specify a configuration for different actions the system takes to screen the communication based on the source contacting entity classification.

18 Claims, 12 Drawing Sheets

(56) References Cited

U.S. PATENT DOCUMENTS

| | | | |
|---|---|---|---|
| 7,586,898 B1 | 9/2009 | Koch et al. | |
| 7,593,517 B2 | 9/2009 | Walsh et al. | |
| 7,761,498 B2* | 7/2010 | Petry et al. | 709/201 |
| 7,849,146 B2* | 12/2010 | Choi et al. | 709/206 |
| 7,930,302 B2 | 4/2011 | Bandaru et al. | 707/737 |
| 7,953,814 B1* | 5/2011 | Chasin et al. | 709/207 |
| 7,974,998 B1* | 7/2011 | Chang | 709/201 |
| 8,139,758 B2 | 3/2012 | Moton et al. | |
| 8,155,287 B2 | 4/2012 | Woodring | |
| 8,275,110 B2 | 9/2012 | Vendrow | |
| 8,331,547 B2 | 12/2012 | Smith et al. | |
| 8,370,930 B2* | 2/2013 | Mills et al. | 726/22 |
| 8,381,120 B2* | 2/2013 | Stibel et al. | 715/780 |
| 8,385,524 B2 | 2/2013 | Fotta et al. | |
| 8,712,907 B1* | 4/2014 | Stibel et al. | 705/38 |
| 2002/0198950 A1* | 12/2002 | Leeds | 709/206 |
| 2003/0204569 A1* | 10/2003 | Andrews et al. | 709/206 |
| 2005/0041789 A1* | 2/2005 | Warren-Smith et al. | 379/93.24 |
| 2006/0075048 A1* | 4/2006 | Gruper et al. | 709/206 |
| 2007/0121596 A1* | 5/2007 | Kurapati et al. | 370/356 |
| 2008/0127345 A1* | 5/2008 | Holtmanns et al. | 726/23 |
| 2008/0133488 A1* | 6/2008 | Bandaru et al. | 707/3 |
| 2009/0064323 A1* | 3/2009 | Lin | 726/22 |
| 2010/0095377 A1* | 4/2010 | Krywaniuk | 726/22 |
| 2010/0250579 A1* | 9/2010 | Levow | 707/769 |
| 2011/0035451 A1* | 2/2011 | Smith et al. | 709/206 |
| 2011/0191847 A1* | 8/2011 | Davis et al. | 726/22 |
| 2011/0197275 A1* | 8/2011 | Chasin et al. | 726/22 |
| 2012/0190386 A1* | 7/2012 | Anderson | 455/456.3 |
| 2012/0215861 A1* | 8/2012 | Smith et al. | 709/206 |
| 2012/0246092 A1* | 9/2012 | Stibel et al. | 705/347 |
| 2013/0103600 A1* | 4/2013 | Stibel et al. | 705/317 |
| 2014/0279394 A1* | 9/2014 | Stibel et al. | 705/38 |

* cited by examiner

INTELLIGENT COMMUNICATION SCREENING TO RESTRICT SPAM

CLAIM OF BENEFIT TO RELATED APPLICATIONS

This application claims the benefit of U.S. provisional application 61/871,794 entitled "Intelligent Communication Screening to Restrict Spam", filed Aug. 29, 2013. The contents of application 61/871,794 are hereby incorporated by reference.

TECHNICAL FIELD

The present invention pertains to communications, and more specifically, communication screening.

BACKGROUND

Having an open communication channel is essential to any entity whether a business or an individual. Landlines and mobiles telephones provide communication channels for voice communications, while data networks (e.g., broadband networks, wireless data networks, etc.) provide communication channels for text message, email, instant messages, and other forms of electronic communication. Businesses rely on these open communication channels in order to interact with their customers, suppliers, and manufacturers. Individuals rely on these open communication channels for socializing and business.

However, an open communication channel can be and often is abused by spammers. As defined herein, a spammer is one who contacts an entity using an open communication channel to that entity for the purpose of promoting a good or service, conveying information, or obtaining information about the contacted entity. A spammer can include an advertiser, salesperson, telemarketer or online marketer, perpetrator of fraud, and promoter as some examples.

Various attempts have been made to keep communication channels open, but restrict the ability of spammers to abuse these channels of communication. Some attempts to address this and related issues have brought about caller-id, personalized calling profiles, and "do not contact" lists for telephone communications and spam filters for electronic communications such as email. Yet, each of these attempts has shortcomings that limit its effectiveness in truly preventing spam.

Caller-id is a service that provides a simple identification string in order to identify the contacting entity or the entity initiating the communication. The identification string can be a telephone number or a name. Caller-id is useful in combating spam when the contacted entity is able to identify spammers solely based on the identification string. In most cases, however, the contacted entity will be unfamiliar with the caller-id provided name or number and therefore have no idea whether the contacting entity is a spammer or not. The contacted entity may simply not answer any contact from an unrecognized caller-id name or number. The is not an ideal manner with which to combat spam, especially when some percentage of the missed contacts are not spam. A further shortcoming is that caller-id does not prevent a spammer from continually reaching out to a contacted entity.

To avoid this latter issue, some services allow an entity to configure a personalized calling profile that is then used to restrict who can contact the entity. The personalized calling profile includes a black-list of telephone numbers or caller-ids of those spammers that the entity does not want to be contacted by. Like the caller-id solution, the personalized calling profile solution requires the entity to identify spammers before being able to black-list them. Although, once a spammer is entered to the black-list, the solution can prevent all future contacts from the spammer without further effort by the entity. This is a reactive solution to spam rather than a proactive solution. Worse yet, this solution imposes a significant configuration burden on each contacted entity. The contacted entity continually updates the black-list to add and remove spammers therefrom. In other words, the personalized calling profile solution does not provide an out-of-the-box solution to combat spam.

Whereas the personalized calling profile is under-inclusive in restricting contact from spammers, "do not contact" lists can be over-inclusive. Once an entity places his contact information on a "do not contact" list, entities that are not necessarily spammers could be prevented from contacting the entity. This solution does not allow the entity to control who is considered a spammer and who is not. The entity also cannot enforce the "do not contact" list. A spammer that circumvents or decides not to adhere to the "do not contact" list will be able to continually contact the entity until the entity contacts some regulatory body to report the abuse and the regulatory body takes action.

For electronic communications, spam filters have been effective in thwarting large scale spamming campaigns, but are less effective in thwarting smaller scale spamming campaigns such as an individual email from an advertiser to a targeted entity. Spam filters black-list known sources of spam. So long as a spammer does not create too large of a spam footprint (e.g., send the same email to hundreds of different recipients), the spam filter will not restrict that spammer's ability to contact others. Spam filters also look for certain content in the communication to identify the communication as spam. Here again, so long as the spammer does not include prohibited content, the spam filter will not restrict that spammer's ability to contact others. As such, spam filters are only effective against the worst violators and only decrease the flow of spam.

Accordingly, there is a need for more intelligent communication screening. Specifically, there is a need for a communication screening solution that does not rely on the entity's own knowledge in differentiating between spammers and non-spammers, but one that identifies spammers for the entity automatically and does so in a proactive manner. There is further a need to enable the entity to then decide whether or not to be contacted by the party attempting to establish contact.

SUMMARY OF THE INVENTION

It is an objective of the present invention to provide a system, methods, and machine implemented processes for intelligent communication screening. As part of the intelligent communication screening, it is an objective to restrict the ability of a spammer from freely contacting an entity over an open communication channel. Specifically, it is an objective to automatically identify spammers on behalf of the entity being contacted, with the entity being contacted merely configuring how communications from automatically identified spammers, potential spammers, and non-spammers should be screened on the entity's behalf.

To achieve these and other objectives, some embodiments provide an intelligent communication screening system. The system is communicably coupled to an extensive entity database. The entity database stores verified information on different entities including individuals and businesses. In some embodiments, the entity database also stores the credibility of each entity either as a score or as an aggregate of qualitative and quantitative data that is related to that entity. Credibility represents the experiences that others have had with an entity. Credibility attests to the reputation, trustworthiness, transparency, stability, and other factors that are useful in determining whether the contacting entity is a spammer or not.

Entities register with the system in order to have their communications screened. For each registered entity, the system is configured to intercept requests to establish contact with that registered entity. To intercept requests, the system of some embodiments assigns new contact information that the registered entity uses to mask its actual contact information, wherein communications to the new contact information are first routed to the system to enable the system to perform communication screening before forwarding the communication to the registered entity. Alternatively, the system of some embodiments intercepts requests using various forwarding and routing techniques well known in the art.

In intercepting the communication establishment request, the system obtains a communication identifier (hereinafter "communication-id"). For telephonic communications, the communication-id can be the caller-id telephone number of the party initiating the communication request. For electronic communications, the communication-id can be an email address or username of the party initiating the communication request.

Upon intercepting a communication-id, the system then performs a lookup of the communication-id against the entity database. From the lookup to the database, the system obtains identifying information and credibility information for the party initiating the contact, also referred to as the contacting entity.

For telephonic communications, the system condenses the obtained information into a form that can be presented in advance of the communication being established. Some embodiments employ a "whisper" to convey the information. The whisper is an audible prompt that is presented to the entity receiving the communication in advance of or inline with establishing the communication. The audible prompt provides an identifying name and/or credibility of the contacting party to indicate to the contacted party, whether the contacting party is or is not a spammer. Instead of the whisper, some embodiments convey the information using caller-id functionality. For example, instead of displaying a telephone number, the system causes a device display to present the identifying name and/or credibility of the contacting party. The receiving entity can then decide whether to receive the communication, not answer the communication, or block the present and future communications from the same contacting party.

Electronic communications can be screened in a similar manner. In some embodiments, a screened email can be encapsulated within a wrapper that presents the true identity of the contacting party, credibility of the contacting party, and a link to access the communication should the receiving entity desire to see the communication. In some embodiments, the screened email is modified to present the contacting party's identity and credibility information in the header or subject field of the email. Screened instant messages can be preceded with a message presenting the identity and credibility.

Some embodiments provide fully automated screening of communications on behalf of registered entities. In some such embodiments, the registered entity specifies the automatic response of the system for screening communications from spammers, potential spammers, and non-spammers. As above, the registered entity does not need to configure any black-lists identifying spammers or white-lists for permitted contacts, and instead relies on the system to automatically identify spammers, potential spammers, and non-spammers from the communication-id. Accordingly, the system intercepts attempts by third parties to establish communication with a registered entity. The system performs a lookup of the communication-id from any intercepted communication request against the entity database. In so doing, the system automatically obtains the contacting party's identifying information and/or credibility. The system then makes a decision based on the obtained information whether the contacting party is a spammer, potential spammer, or non-spammer. The decision can also be based on the presence or absence of verified information in the entity database about the contacting party. For instance, if the identity of the contacting party has been previously verified, then the system may classify the contacting party as a non-spammer. However, if the contacting party's identity has not been verified, then the system may classify the contacting party as a spammer or potential spammer. The system then screens the intercepted communication according to responses configured by the registered entity. For example, the registered entity can configure the system to block all communications from parties that the system automatically identifies as spammers, automatically send telephone communications from parties that the system automatically identifies as potential spammers directly to voicemail, and permit communications from parties that the system automatically identifies as non-spammers.

To improve the accuracy with which the system automatically identifies spammers from non-spammers, some embodiments perform a pre or post verification of the contacting entity. In some such embodiments, when the system cannot accurately classify a contacting entity or the system wishes to update its information, the system requires the contacting entity to complete a verification process prior to allowing the contacting entity access to any of the system's registered entities. In some other embodiments, the system may allow a contacting entity to contact one of the system's registered contacted entities. Then post-contact, the system queries the contacted entity as to whether the contacting entity classifies as a spammer, potential spammer, or non-spammer. The system may require answers from some threshold number of the contacted entities before locking the contacting entity's classification as a spammer, potential spammer, or non-spammer.

BRIEF DESCRIPTION OF THE DRAWINGS

In order to achieve a better understanding of the nature of the present invention a preferred embodiment of the intelligent communication screening system will now be described, by way of example only, with reference to the accompanying drawings in which.

DETAILED DESCRIPTION OF THE INVENTION

Figure 1:
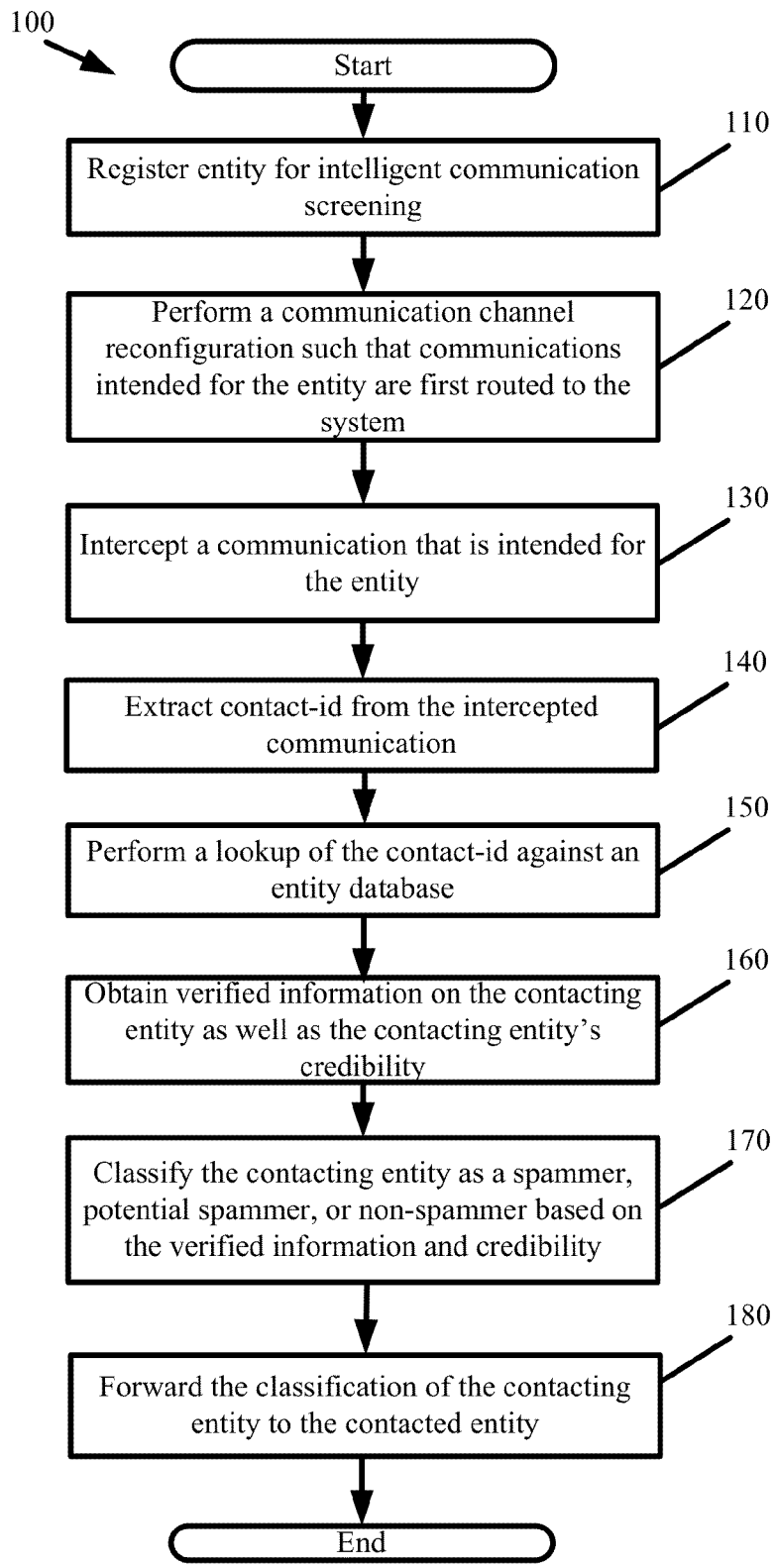
FIG. 1 presents a process with which the system intelligently screens a communication on behalf of a registered contacted entity in accordance with some embodiments.

In the following detailed description, numerous details, examples, and embodiments of an intelligent communication screening system and methods are set forth and described. As one skilled in the art would understand in light of the present description, the system and methods are not limited to the embodiments set forth, and may be practiced without some of the specific details and examples discussed. Also, reference is made to the accompanying figures, which illustrate specific embodiments in which the system and methods can be practiced. It is to be understood that other embodiments can be used and structural changes can be made without departing from the scope of the embodiments herein described.

To facilitate the discussion that is to follow, definitions are provided for certain terms used throughout this disclosure. An entity includes an individual or business, wherein the business is represented by and through actions taken by its agents. A contacting entity is any entity that initiates contact with another entity. The term contact is used interchangeably herein with the term communication. A contact or communication can be initiated over any of a variety of communication channels including telephone, email, text message, and instant message as some examples. A contacted entity is any entity that is the intended recipient of a communication. In other words, the contacted entity is the entity being contacted by the contacting entity. For example, the entity making a telephone call is the contacting entity and the entity receiving the telephone call is the contacted entity. As defined in the background section, a spammer is one who contacts an entity using an open communication channel to that entity for the purpose of promoting a good or service, conveying information, or obtaining information about the contacted entity. A spammer can include an advertiser, salesperson, telemarketer or online marketer, perpetrator of fraud, and promoter as some examples. Credibility is one metric with which to identify a spammer. The credibility of an entity is derived from the experiences that others have had with that entity. More specifically, credibility attests to the reputation, trustworthiness, transparency, stability, and other factors that are commonly used to determine whether to engage with another. A credibility scoring system and database is described in U.S. patent application Ser. No. 13/071,434 which is incorporated herein by reference.

Some embodiments provide a system and methods for intelligent communication screening. The intelligent communication screening restricts the ability of spammers to contact a registered entity of the system using any of several open communication channels. The system operates in an automated manner by classifying the contacting entity as a spammer, potential spammer, or non-spammer without any involvement from the contacted entity. In other words, the system identifies spammers without the need for any preconfigured black-lists or white-lists, manual identification of spammers, or contacted entity provided criteria for identifying spammers.

In some embodiments, the system leverages credibility of the contacting entity for dynamic and on-the-fly identification and classification of the contacting entity. In some embodiments, the system leverages information about the contacting entity, such as the entity's industry classification, occupation, etc. for dynamic and on-the-fly identification and classification of the contacting entity. This information can be obtained from an extensive entity database that the system of some embodiments is coupled and provided access to. Further description of the entity database is provided with reference to FIG. 5 below. In some embodiments, the credibility and other information is aggregated from external or public sources such as various credit and credibility reporting agencies, entity websites, etc.

In some embodiments, the system passes the classification determination to the contacted entity prior to the communication being established. Upon obtaining the classification determination, the contacted entity can respond differently to communications from identified spammers, potential spammers, and non-spammers. In some embodiments, the system automatically screens communications on behalf of the contact entity based on a set of actions that the contacted entity configures for spammers, potential spammers, and non-spammers.

FIG. 1 presents a process 100 with which the system intelligently screens a communication on behalf of a registered contacted entity in accordance with some embodiments. Specifically, the process 100 provides the contacted entity with the classification of the contacting entity that initiates the communication.

The process 100 commences by registering (at 110) an entity with the intelligent screening system of some embodiments. Registration can be conducted in a several ways. In preferred embodiments, the entity accesses an online interface generated by the system to provide the required registration information. As part of the registration, the process performs (at 120) a communication channel reconfiguration such that communications intended for the entity are first routed to the system. Registration and the communication channel reconfiguration is further described with reference to FIG. 5 below.

After registration is complete, the system begins monitoring for and intercepts (at 130) a communication that a source contacting entity sends or initiates with the target contacted entity, wherein the contacted entity has registered for the intelligent communication screening service of some embodiments. The process extracts (at 140) a communication identifier (hereinafter "communication-id") from the intercepted communication. When the intercepted communication is a voice communication (e.g., telephone call), the communication-id is the caller-id or telephone number of the contacting entity. When the intercepted communication is an electronic communication, the communication-id can be an email address or username of the contacting entity.

Next, the process performs (at 150) a lookup of the communication-id against an entity database. As a result of the lookup, the process obtains (at 160) verified information on the contacting entity. In some embodiments, the system supplements the verified information that is obtained from the entity database with information from other external or public sources. The process then classifies (at 170) the contacting entity as a spammer, potential spammer, or non-spammer using the obtained verified information.

In some embodiments, the verified information identifies the occupation or industry of the contacting entity. Entities with certain occupations or operating in certain industries, such as advertising, can be classified as spammers when performing the entity classification. In some embodiments, the verified information identifies whether the contacting entity has certain accreditations, certifications, etc. These accreditations and certifications can aide in the classification of the contacting entity. In some embodiments, the presence or lack of verified information can be used to classify the contacting entity. For instance, if the contacting entity is a business and there is no verified street address or state of incorporation for the business, then that business can be classified as a potential spammer. In some embodiments, the verified information identifies the contacting entity's credibility. Credibility can be used to classify the contacting entity based on whether that entity's credibility meets or exceeds certain credibility thresholds that are set for classification as a spammer, potential spammer, or non-spammer. A numerical quantifier, such as a credibility score, can simplify this classification. Entity credibility is also composed of qualitative and quantitative credibility data. The qualitative credibility data is composed of reviews relating to experiences that others have had with the source contacting entity, and wherein the reviews convey some sentiment connoting a degree of positivity or negativity. The quantitative credibility data is composed of scores that rate experiences that others have had with the contacting entity. Should the credibility of the contacting entity disproportionately consist of negative reviews and ratings, then the system can classify that entity as a spammer or potential spammer. In some embodiments, the verified information identifies the contacting entity's creditworthiness or credit score. Such credit information can be used independently or in combination with other verified information when classifying the contacting entity. It should be apparent that the classifications can be based on different combinations of verified information. For instance, a contacting entity identified as an advertiser with poor credibility will be identified as a spammer, whereas a contacting entity identified as a parts supplier with poor credibility will be identified as a potential spammer or non-spammer.

Steps 150-170 differentiate the intelligent communication screening of some embodiments from those of the prior art. Specifically, by leveraging the verified information from the entity database, the process 100 can dynamically and on-the-fly identify and classify the contacting entity without reliance on any enumeration or listing of spammers, potential spammers, and non-spammers. As such, the system operates to screen communications from spammers without reliance on any form of a black-list of spammers or white-list of non-spammers.

The process forwards (at 180) the classification of the contacting entity to the contacted entity. The process may involve forwarding the classification before the communication is forwarded or inline with the forwarding of the communication. In some embodiments, the process forwards the classification as a "whisper" for a voice communication. The whisper involves presenting an audible prompt when the contacting entity first answers or receives the communication. In some embodiments, the whisper states the contacting entity's classification as either a spammer, a potential spammer, or a non-spammer. In some embodiments, the whisper alternatively or additionally states the name of the contacting entity, a credibility score of the contacting entity, other identifying information or some combination thereof. After the whisper is played, the contacted entity has the option to continue the communication with the contacting entity, terminate the communication, or redirect the communication to a different destination such as a voicemail or alternative number. The different options can be selected using different touch tone key presses or the system can automatically select one of the options based on rules configured by the contacting entity as part of registering with the system. In some embodiments, the process forwards the classification as a text string for caller-id. In some embodiments, the process forwards the classification within a wrapper encapsulating an electronic communication or as information that is embedded within the electronic communication. Here again, the credibility and other identifying information of the contacting entity can be included within the wrapper or embedded as part of the communication.

Figure 2:
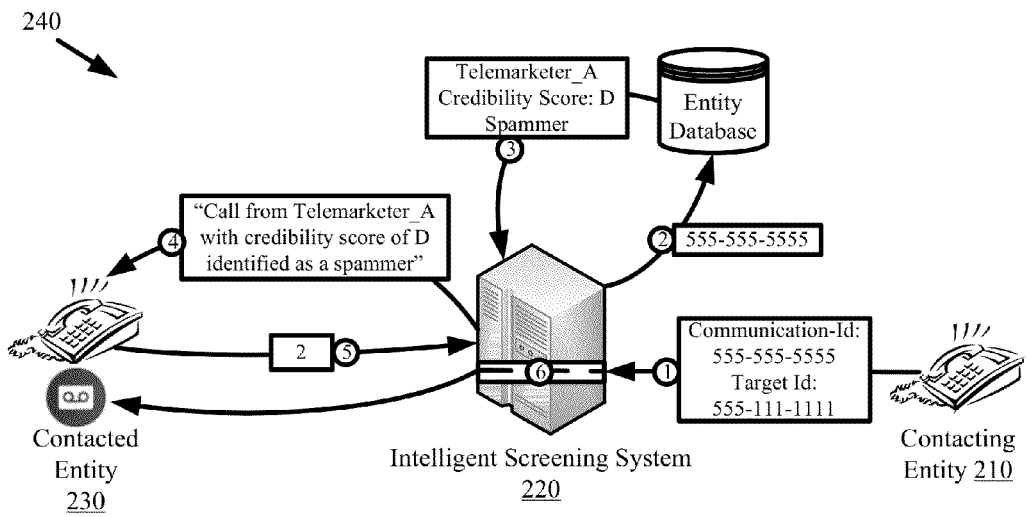
FIG. 2 conceptually illustrates the contacting entity classification and notification provided by the system of some embodiments.
Figure 2:
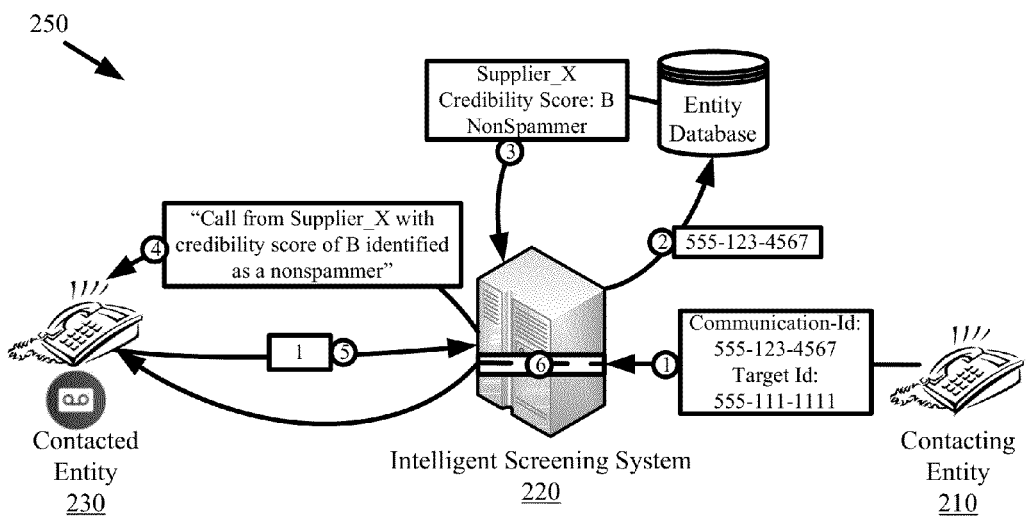

FIG. 2 conceptually illustrates the contacting entity classification and notification provided by the system of some embodiments. The figure depicts a contacting entity 210, the system 220 intercepting communication requests from the contacting entity 210, and a contacted entity 230 that has registered with the system 220 for the intelligent screening service and that is the intended recipient of the contacting entity's 210 communication. The figure depicts two different scenarios 240 and 250.

In scenario 240, the system 220 intercepts a communication request from the contacting entity 210, performs a lookup of the communication-id extracted from the communication request, and automatically classifies the contacting entity 210 as a spammer based on information obtained from the lookup. Prior to or inline with forwarding the communication request from the contacting entity 210 to the contacted entity 230, the system 220 contacts the contacted entity 230 and provides a whisper message upon the contacted entity 230 answering. The whisper identifies the contacting entity 210, its credibility score, and its classification as a spammer. The contacted entity 230 then chooses how to respond to the contacting entity 210 based on an audible answer or pressing of a touch tone key. In scenario 240, the contacted entity 230 presses the number 2 on the telephone to redirect the contacting entity 210 communication to voicemail.

In scenario 250, the system 220 intercepts the communication request from the contacting entity 210, performs a lookup of the communication-id, and automatically classifies the contacting entity 210 as a non-spammer based on information obtained from the lookup. The system 220 provides the contacted entity 230 with the whisper conveying the identity of the contacting entity 210, its classification, and its credibility score. In scenario 250, the contacted entity 230 presses the number 1 on the telephone to answer the contacting entity 210 communication. A third selectable option could involve dropping the call if the contacted entity 230 presses the number 3 on the telephone.

Figure 3:
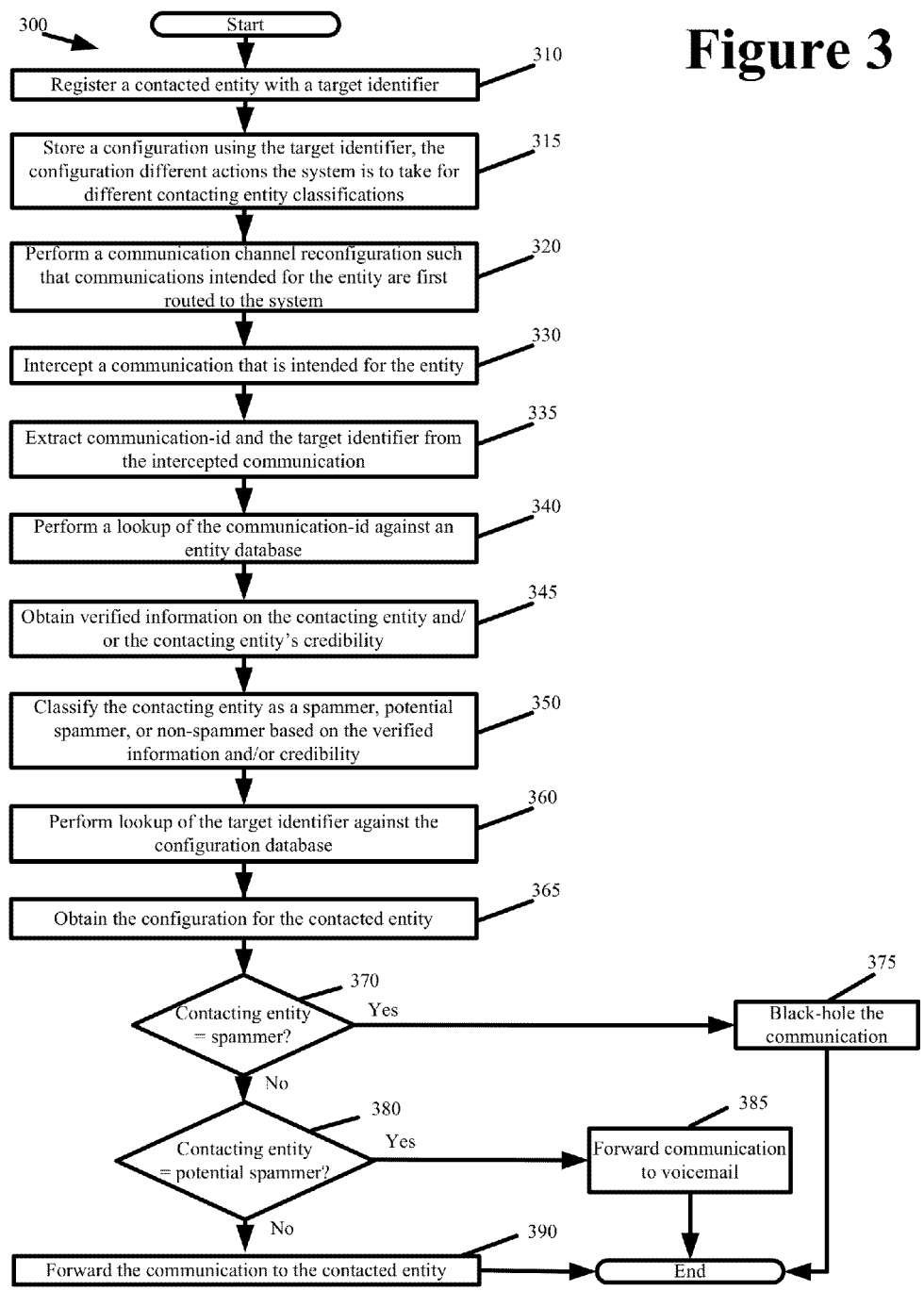
FIG. 3 presents a process for automatically classifying a contacting entity and screening the communication originated by that contacting entity based on preconfigured actions specified by the contacted entity in accordance with some embodiments.

Some embodiments expand on the methodology of FIG. 1 by providing a fully automated solution that screens incoming communications on behalf of the contacted entity based on preconfigured actions specified by the contacted entity. FIG. 3 presents such a process 300 for automatically classifying a contacting entity and screening the communication originated by that contacting entity based on preconfigured actions specified by the contacted entity in accordance with some embodiments.

Process 300 mirrors some of process 100. As before, the process 300 begins by registering (at 310) the contacted entity for the intelligent communication screening. As part of the registration, the contacted entity provides a target identifier and defines a configuration. The target identifier is the telephone number, email address, username, or handle that is used to reach the contacted entity. The configuration is identified with the target identifier. The configuration definition directs how the system screens communications that are intended for the contacted entity. Specifically, the contacted entity defines different actions that the system is to take on behalf of the contacted entity when the system intercepts a communication intended for the contacted entity from a contacting entity that is automatically identified and classified by the system as a spammer, potential spammer, or non-spammer. It should be apparent that the configuration can specify actions for other classifications of the contacting entity. The process generates and stores (at 315) the configuration for the contacted entity. The process then performs (at 320) the communication channel reconfiguration such that communications intended for the contacted entity are first routed to the system.

Thereafter, the process intercepts (at 330) a communication that is intended for the contacted entity prior to the communication reaching the contacted entity. The communication is originated by a contacting entity. The process extracts (at 335) the communication identifier (i.e., communication-id) identifying the contacting entity and the target identifier identifying the contacted entity from the intercepted communication. For an intercepted telephone communication, the communication-id is the telephone number of the dialer and the target identifier is the telephone number of the call recipient. For an email communication, the communication-id can be either the IP address or email address of the mail sender and the target identifier can be either the IP address or email address of the mail recipient.

The process performs (at 340) a lookup of the communication-id against the entity database in order to obtain (at 345) verified information on the contacting entity. The process classifies (at 350) the contacting entity as a spammer, potential spammer, or non-spammer based on the obtained verified information.

The process performs (at 360) a lookup of the target identifier against the configuration database in order to obtain (at 365) the configuration for the contacted entity. The process then screens the communication according to the action that is specified in the configuration for the contacting entity classification.

As shown, when the contacting entity is identified (at 370) from the classification as a spammer, the process performs a first action to "black-hole" (at 375) the communication. In some embodiments, black-holing the communication may involve dropping the communication, providing a recorded message that the contacted entity does not accept communications from spammers, or forwarding the communication to a secondary address provided by the contacted entity. When the contacting entity is identified (at 380) from the classification as a potential spammer, the process performs a second action involving forwarding (at 385) the communication directly to voicemail, thereby allowing the contacting entity to leave a message for the contacted entity that the contacted entity can respond to if so desired. When the contacting entity is identified (at 380) from the classification as a non-spammer, the process performs a third action involving forwarding (at 390) the communication to the entity and the process ends.

Figure 4:
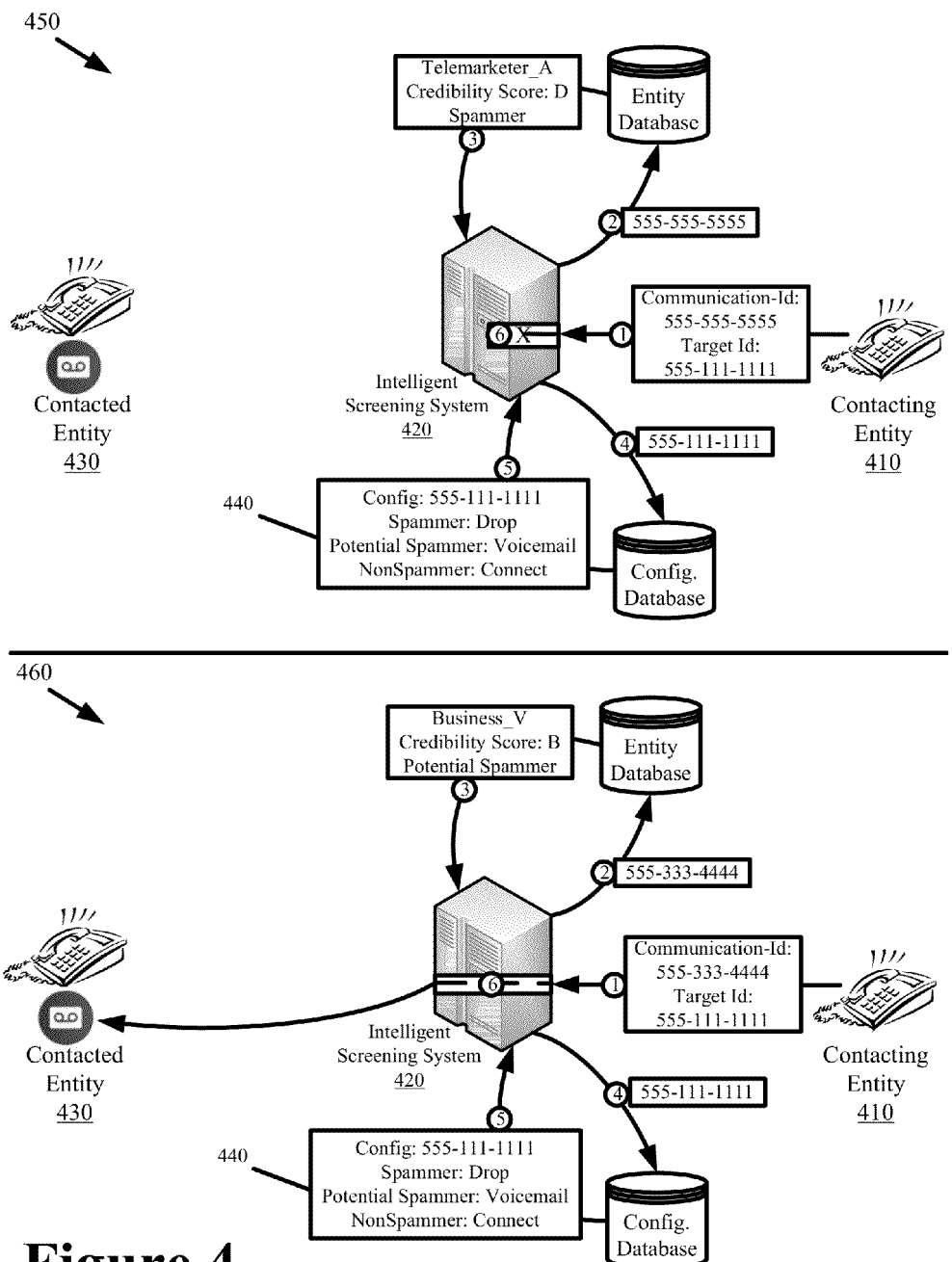
FIG. 4 conceptually illustrates the contacting entity classification and automatic action taken on behalf of the contacted entity by the system based on actions that were preconfigured by the contacted entity.

In accordance with some embodiments, FIG. 4 conceptually illustrates the contacting entity classification and automatic action taken on behalf of the contacted entity by the system based on actions that were preconfigured by the contacted entity. The figure depicts a contacting entity 410, the system 420 intercepting communication requests from the contacting entity 410, and a contacted entity 430 that has registered with the system 420 and that has specified a configuration 440. The figure depicts two different scenarios 450 and 460.

In scenario 450, the system 420 intercepts the communication request from the contacting entity 410, performs a lookup of the communication-id, and classifies the contacting entity 410 as a spammer based on the information obtained from the lookup. The system 420 then accesses the contacted entity configuration 440 using the target identifier extracted from the communication request. From the configuration 440, the system 420 determines that the contacted entity 430 wants all communications from contacting entities that are classified as spammers to be dropped. Accordingly, the system 420 drops the communication request such that the contacting entity 410 is unable to reach the contacted entity 430. In some embodiments, the system 420 provides a message or response to the contacting entity 430 to explain why its communication request was dropped. In some embodiments, the system 420 tracks the communication request to a log that the contacted entity 430 can view to see that it was contacted by the contacting entity 410.

In scenario 460, the system 420 intercepts the communication request from the contacting entity 410, performs a lookup of the communication-id, and determines classifies the contacting entity 410 as a potential spammer based on the information obtained from the lookup. The system 420 then accesses the contacted entity configuration 440. From the configuration 440, the system 420 determines that the contacted entity 430 wants all communications from contacting entities that are classified as potential spammers to be sent directly to voicemail. Accordingly, the system 420 forwards the communication request to the contacted entity's 430 voicemail.

The intelligent communication screening system can be implemented as either a centralized system or a distributed system. In either implementation, the function and operation is performed by one or more servers of the system. Each server is configured to perform functionality defined by one or more modules that are stored to non-transitory computer-readable media of the servers and that are executed by at least one processor of the servers. As such, the servers are special purposed machines that produce the intelligent communication screening functionality, services, and system. The hardware components of the system servers are described in greater detail with reference to FIG. 12 below.

Figure 5:
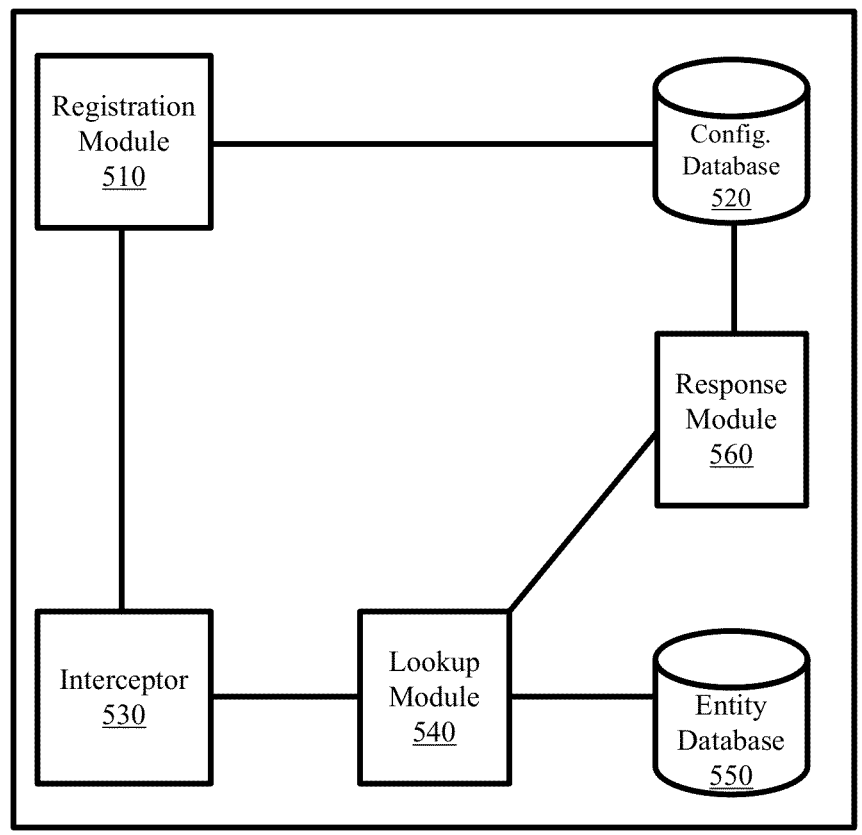
FIG. 5 provides a conceptual architectural implementation of the intelligent communication system in accordance with some embodiments.

FIG. 5 provides a conceptual architectural implementation of the intelligent communication system in accordance with some embodiments. As shown, the system includes a registration module 510, configuration database 520, communication interceptor 530, lookup module 540, entity database 550, and response module 560.

The registration module 510 provides the functionality for registering entities for the intelligent communication screening. Registration is normally conducted online. The registrant directs a web browser or other application to a network accessible site that is generated by the registration module 510 and that is accessible from the server executing the registration module 510. The registrant registers by providing identifying information, contact information, and by specifying login credentials such as a username and password. The contact information can be for any one of several communication channels that the system can intelligently screen. Some such communication channels include voice communications, email, instant message, SMS messaging, or text messaging. Accordingly, the contact information can be a telephone number, email address, username, or user handle as some examples. The registration module 510 uses the contact information to perform the communication channel reconfiguration.

For voice communications, the communication channel reconfiguration may involve configuring a forwarding rule such that communications intended for the registered entity are forwarded to the communication interceptor 530. This may involve enabling call forwarding and entering a telephone number of the communication interceptor 530 as the forwarding number. Alternatively, the communication channel reconfiguration may involve reconfiguring the destination IP address to which a telephone call is routed in a Voice-Over-IP (VoIP) communication channel such that the call is routed to the communication interceptor 530. Alternatively, the communication channel reconfiguration may involve reconfiguring call routing components of circuit switched telephony systems to cause voice communication to be routed to the communication interceptor 530. Alternatively, the communication channel reconfiguration may involve assigning a new communication-id for the registering entity, wherein any communications to the new communication-id are first routed to the system and the system can subsequently forward such communications back to the entity using the entity's old communication-id. For electronic communications, the communication channel reconfiguration may involve IP address redirection or forwarding to cause emails, instant messages, etc. to be routed to the system before being forwarded to the registering entity.

Registrants also interact with the registration module 510 to configure how the system screens incoming communication on behalf of the registrants. Specifically, a registrant specifies the different actions that the system automatically takes on its behalf when an intercepted communication originates from a contacting entity that is automatically classified by the system as a spammer, potential spammer, or non-spammer. As some examples, the actions can include forwarding the communication to the registrant, forwarding the communication directly to voicemail, or black-holing the communication. In some embodiments, registrants can also specify custom actions. For example, forwarding communications that originate from a spammer to a first communication-id of the registrant and forwarding communications from a non-spammer to a second communication-id of the registrant. For any classification, the registrant can specify exceptions to the configured action. For example, the registrant may want all spammers to be directly sent to voicemail except for two spammers whose communication-ids are specifically carved out and white-listed in the configuration. Similarly, the registrant may want to receive communications from all classified non-spammers except some subset of non-spammers whose communication-ids are black-listed in the configuration.

In some embodiments, the actions specified as part of a registrant's configuration can be qualified with additional parameters including time of day, day of week, and geographic region as some examples. For instance, a configuration may define that calls from all contacting entities including spammers are accepted during business hours, but calls from spammers outside of business hours are dropped. Similarly, a home resident may configure all calls to be directed to voicemail during nighttime hours to avoid being disturbed, while allowing calls from non-spammers and potential spammers during daytime hours. In one more example, geographic region qualifiers may be configured. Specifically, the system is able to identify the geographic region of the contacting entity based on its area code, IP address, or verified information. Accordingly, a contacted entity may specify rules whereby spammers within the same city or state as the contacted entity are connected to the contacted entity, whereas spammers outside the city or state are sent directly to voicemail.

To specify an action, a registrant accesses a graphical user interface (GUI) generated by the registration module 510. Using the GUI, the registrant specifies a classification to which the action is to apply. Default classifications that the registrant can select from include spammer, potential spammer, and non-spammer in some embodiments. The system is configured with default criteria for determining how a contacting entity is to be classified. In some embodiments, entities that operate in certain industry classifications, have certain occupations, have certain credibility scores, or some combination thereof are classified to the default classifications. In some embodiments, the registrant can customize the classifications as well as the criteria by which the system identifies a contacting entity as a spammer, potential spammer, or non-spammer. For example, the registrant can select which industry classifications, occupations, credibility scores, or combination thereof defines a contacting entity as a spammer, potential spammer, or non-spammer.

Figure 6:
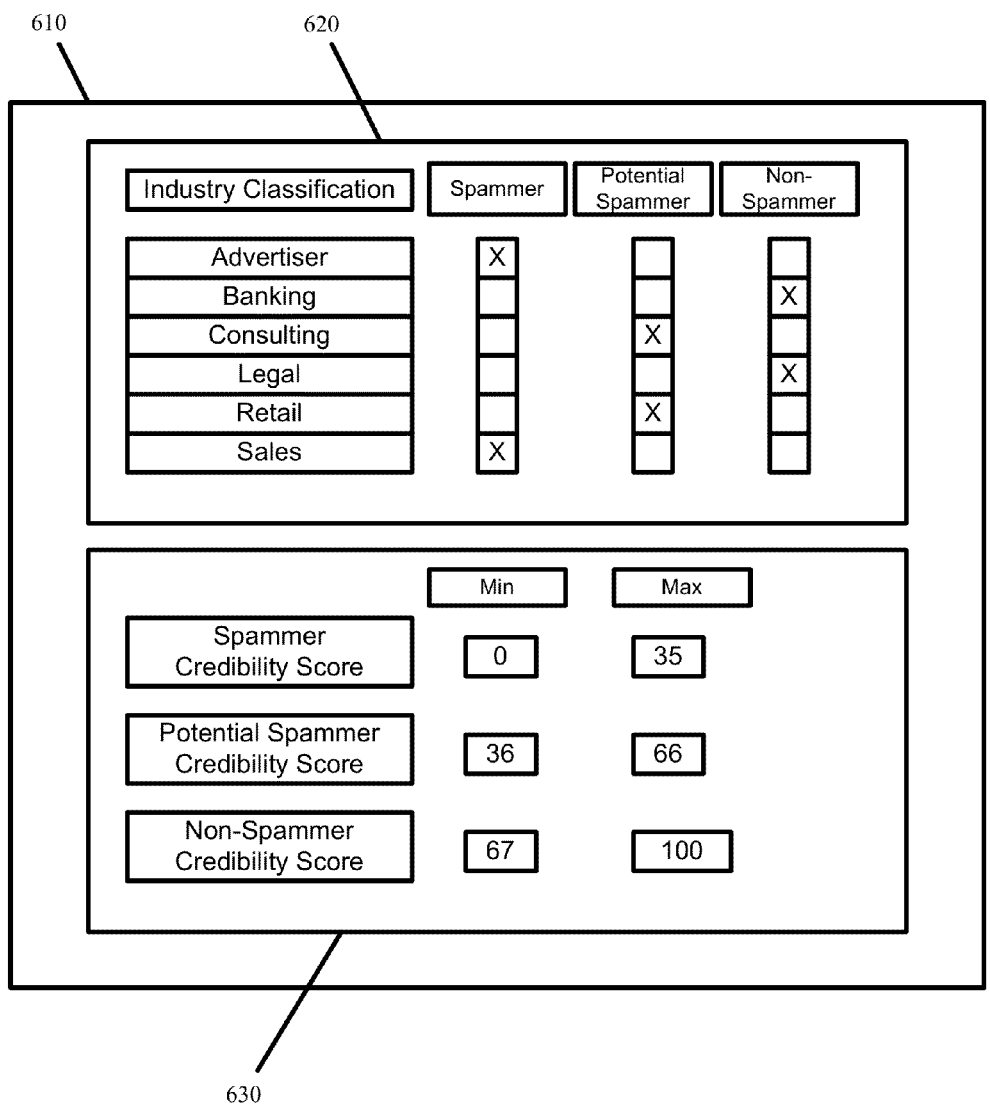
FIG. 6 illustrates an interface with which registrants can customize the criteria used to classify contacting entities.

FIG. 6 illustrates an interface 610 with which registrants can customize the criteria used to classify contacting entities. The interface 610 provides a first selection window 620 that lists different industries or occupations and three checkboxes for specifying which industry or occupation is considered to be spammer, potential spammer, or non-spammer.

The interface 610 also provides a second window 630 that may operate independent of or in combination with the criteria that are specified in the first window 620. As shown, the second window 630 is used to set the criteria for classifying entities based on their credibility scores. The registrant specifies a first range of credibility scores that will classify contacting entities having a credibility score in that range as a spammer, a second range of credibility scores that will classify contacting entities having a credibility score in that range as a potential spammer, and a third range of credibility scores that will classify contacting entities having a credibility score in that range as a non-spammer. The custom classification criteria are stored to the corresponding contacted entity or registrant configuration.

For each registrant, the registration module 510 stores a different configuration to the configuration database 520. Each configuration is stored with a target identifier. The target identifier enables the system, and more specifically, the response module 560, to retrieve the appropriate configuration for screening intercepted communications. The target identifier is the identifier by which the registrant or contacted party is contacted. The target identifier can be the contacted entity's telephone number, email address, username, handle, IP address, or some combination thereof.

The communication interceptor 530 intercepts communications as a result of the communication channel reconfiguration performed during registration. Consequently, the communication interceptor 530 may intercept telephone calls, emails, text messages, SMS messages, and instant messages as some examples. The communication interceptor 530 includes a buffer to temporarily store the intercepted communication. The buffer typically is the non-transitory computer-readable medium of the server executing the communication interceptor 530 functionality. The communication is held in the buffer until the contacting entity is identified, classified, and the appropriate screening action is determined.

To identify the contacting entity, the communication interceptor 530 extracts the communication-id from the intercepted communication. For voice communications, this includes extracting the calling line identity (CLI) or caller-id from the communication, wherein the caller-id can include a telephone number or a text string identifying the contacting entity. For electronic communications, this includes extracting the email address, username, or telephone number from the communication. The communication interceptor 530 may be configured with a line sniffer that allows the communication interceptor 530 to examine the intercepted communication for the contacting entity's communication-id. The communication interceptor 510 also extracts a target identifier from any intercepted communication, wherein the target identifier is the telephone number, email address, username, etc. of the contacted entity that is the intended recipient of the intercepted communication.

The communication interceptor 530 passes the extracted communication-id to the lookup module 540. The lookup module 540 then queries the entity database 550 using the extracted communication-id to retrieve verified information about the contacting entity, credibility of the contacting entity, or some combination thereof.

The entity database 550 stores verified information on different entities. The verified information typically includes identifying information such as the name, contact information (e.g., telephone number, email address, street address, domain name, etc.), and occupation or industry classification for the various entities. The verified information for the contacting entity is identified by matching the communication-id of the contacting entity to the identifying information for the proper contacting entity. Depending on the entity, the verified information may also include publicly available financial information, key personnel (e.g., management or executive team), and legal history as some examples. The information for a particular entity can be verified by contacting that particular entity, by contacting trade references or associates of the particular entity, by relying on various third party accreditations, or by cross comparing the information against publicly available information on the particular entity including the governmental sources, social media, and the particular entity's own sites as some examples. Several such entity databases are maintained by credit or credibility reporting agencies. The entity database 550 can therefore be one that is hosted and maintained by the system or by an outside third-party that permits the system access to the database.

In some embodiments, the verified information includes a contacting entity's credibility either as a score or aggregated data. Entity credibility represents the experiences that others have had with an entity. Credibility attests to the reputation, trustworthiness, transparency, stability, and other factors that are useful in determining whether the contacting entity is a spammer or not. Data representative of entity credibility may include qualitative data such as user reviews, professional critiques, Better Business Bureau (BBB) complaints, and social media posts that target the entity. Data representative of entity credibility may also include quantitative data such as user ratings, credit scores, and number of BBB complaints as some examples. In some embodiments, the credibility data is quantified as a numerical score.

In some embodiments, the verified information includes a contacting entity's creditworthiness. Creditworthiness is tracked by various credit reporting agencies. Like credibility, creditworthiness can be represented as a score or as sets of credit data including, for example, amount of outstanding debt, timeliness of debt payments, and active lines of credit.

Figure 7:
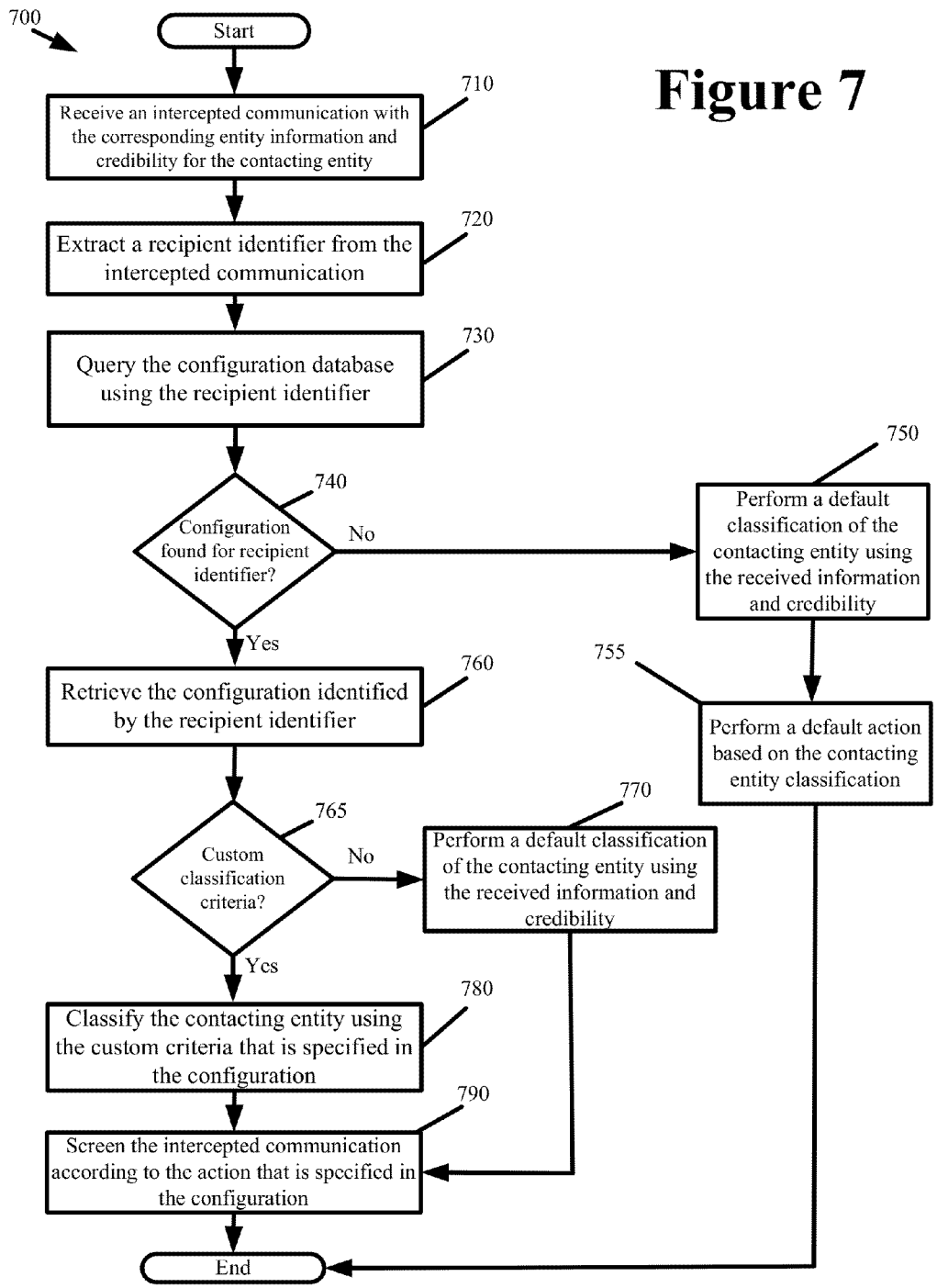
FIG. 7 presents a process performed by the response module for classifying the contacting entity and screening the intercepted communication according to the classification.

The information retrieved from the entity database 550 is then passed to the response module 560. The response module 560 is tasked with classifying the contacting entity and screening the intercepted communication according to the classification. FIG. 7 presents a process 700 performed by the response module 560 for classifying the contacting entity and screening the intercepted communication according to the classification.

The process 700 commences upon receiving (at 710) an intercepted communication with the corresponding verified information for the contacting entity that originates that communication. The process proceeds to classify the contacting entity by determining if the contacted entity has defined a configuration specifying custom classification criteria. To make this determination, the process extracts (at 720) a target identifier from the intercepted communication. The target identifier identifies the intended recipient or contacted entity. For voice communications, the target identifier will be the telephone number that was dialed. For electronic communications, the target identifier can be the destination IP address, recipient email address, or username for the message recipient.

The process queries (at 730) the configuration database 520 using the target identifier. The query determines (at 740) if the contacted party has defined a configuration to customize the response of the response module 560. Specifically, the query determines whether the configuration database 520 stores a configuration for the target identifier.

When a configuration is not defined for the target identifier, the process performs (at 750) a default classification of the contacting entity based on the obtained verified information. In some embodiments, the contacting entity is classified to one of three default classifications: spammer, potential spammer, and non-spammer, though other embodiments allow for additional or different classifications. The classification is performed based on the industry or occupation of the contacting entity, credibility of the contacting entity, or some combination thereof. Other factors can contribute to the default classification. For example, an absence of information can be indicative of a spamming or potentially spamming entity. Next, the process performs (at 755) a default action based on the contacting entity classification and the process ends. In some embodiments, the default action can include "blackholing" the communication when the communication originates from a contacting party who is a marketer or has credibility below a first threshold, forwarding the communication directly to a mailbox when the communication originates from a contacting party who is in the same industry or occupation as the contacted party or has credibility between the first threshold and a second threshold, and forwarding the communication to the contacted party when the communication originates from a user, supplier, logistics provider, etc. or has credibility greater than the second threshold.

When a configuration is defined for the target identifier, the process retrieves (at 760) the configuration from the configuration database 520. The process then determines (at 765) whether custom criteria are defined in the configuration for classifying the contacting entity. If not, the process classifies (at 770) the contacting entity based on the default criteria defined for a spammer, potential spammer, and non-spammer. Otherwise, the process classifies (at 780) the contacting entity using the custom criteria that are specified in the configuration. The process then screens (at 790) the intercepted communication according to the action that is specified in the configuration for the contacting entity classification.

To account for missing or outdated verified information on some contacting entities, some embodiments implement a pre or post verification of those and other entities. The verification serves to supplement or update the verified information of the entity database as well as obtain information about new entities that are previously unaccounted for in the entity database.

The pre-verification involves intercepting a contacting entity's communication and preventing forwarding of the communication to the intended contacted entity until the contacting entity is verified by the system. The post-verification involves forwarding a contacting entity communication to its intended contacted entity and at the end of the communication, obtaining verified information about the contacting entity from the contacted entity.

Figure 8:
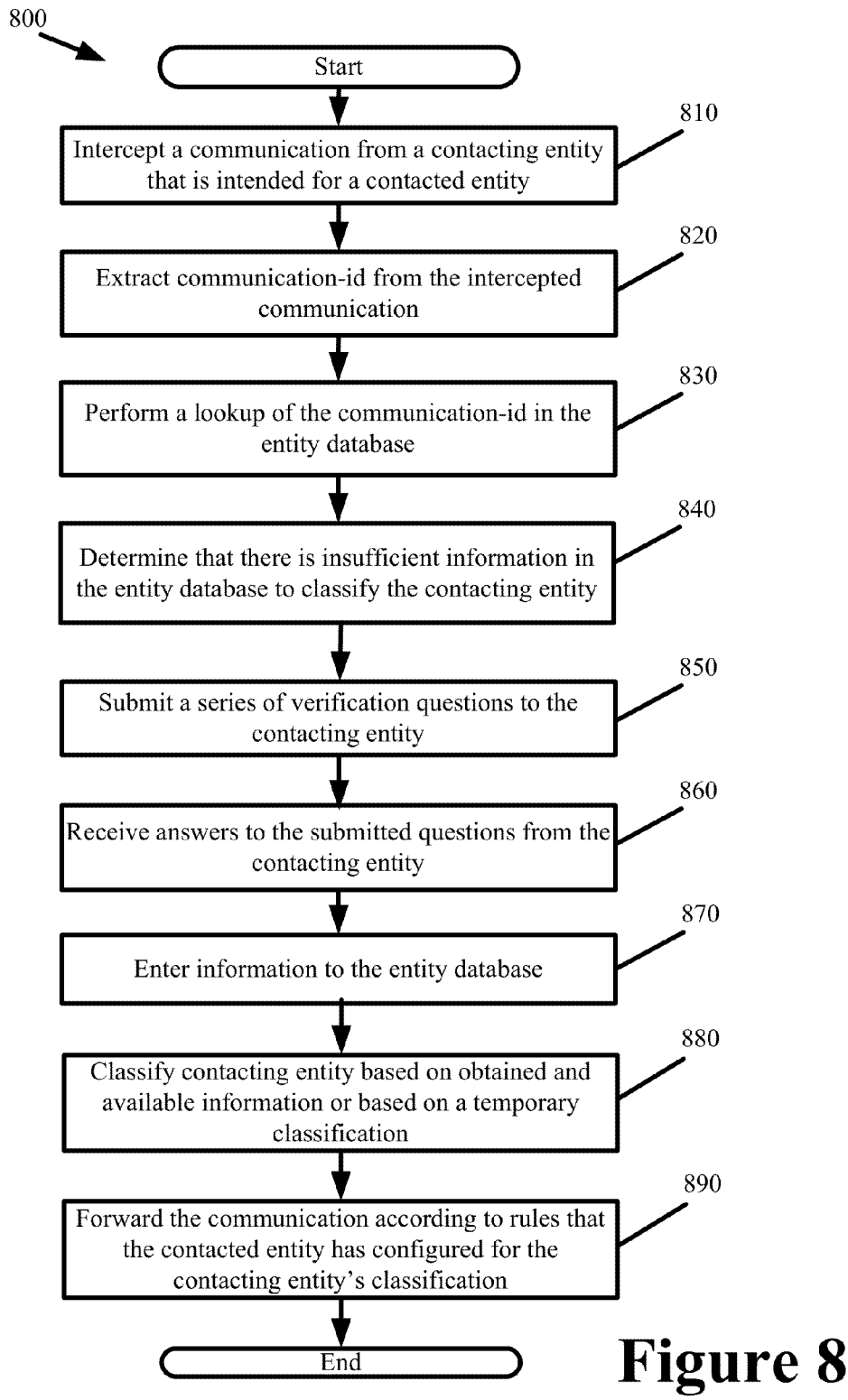
FIG. 8 presents a pre-verification process for obtaining classification information on a contacting entity prior to forwarding an intercepted communication from that contacting entity.

In accordance with some embodiments, FIG. 8 presents a pre-verification process 800 for obtaining classification information on a contacting entity prior to forwarding an intercepted communication from that contacting entity. The process 800 is performed by the intelligent communication screening system of some embodiments. The process 800 commences by intercepting (at 810) a communication that the contacting entity initiates and intends for a contacted entity. The process extracts (at 820) the communication-id of the contacting entity from the communication. The process performs (at 830) a lookup of the communication-id in the entity database to determine (at 840) that the entity database does not contain a record with verified information that matches to the communication-id or the record matching to the communication-id does not contain a sufficient amount of verified information to accurately classify the contacting entity.

Using the communication-id of the contacting entity, the process submits (at 850) a series of verification questions back to the contacting entity while continuing to block the contacting entity's communication by not forwarding the communication to the contacted entity. The questions can include requesting the contacting entity to specify the purpose of its communication, the industry in which it operates, a link to the contacting entity's website, or name, email address, or other contact information of the contacting entity as some examples. Alternatively, the questions may request identification information for trade references of the contacting entity. Trade references include third parties that have conducted or engaged in a commercial transaction with the contacting entity and can provide verified information about the contacting entity as a result. Trade references can include customers, suppliers, manufacturers, or other service providers of the contacting entity. At some later point in time, the system contacts each of the trade references in order to acquire information about the contacting entity that can be used in classifying the contacting entity. It should be apparent that an exhaustive listing of all possible questions that can be asked as part of the pre-verification process 800 is beyond the scope of the disclosure and is omitted for simplicity.

The process receives (at 860) answers to the submitted questions from the contacting entity. The answers may be provided by voice or touch tone entry when the communication involves a telephone call. Alternatively, the answers can be provided over an electronic medium by typing answers or selecting from a series of selection boxes when the communication involves some digital form of communication (e.g., email, text message, etc.). If the contacting entity refuses to answer the questions, its communication may be dropped and not delivered to the intended contacted entity or the communication may be directed directly to a voicemail or other message repository. Alternatively, the process may temporarily classify such an entity as a spammer.

Any obtained information for the contacting entity from the provided answers is then entered (at 870) to the entity database. Subsequent communications from the contacting entity can then be classified using the verified information entered to the entity database.

Figure 9:
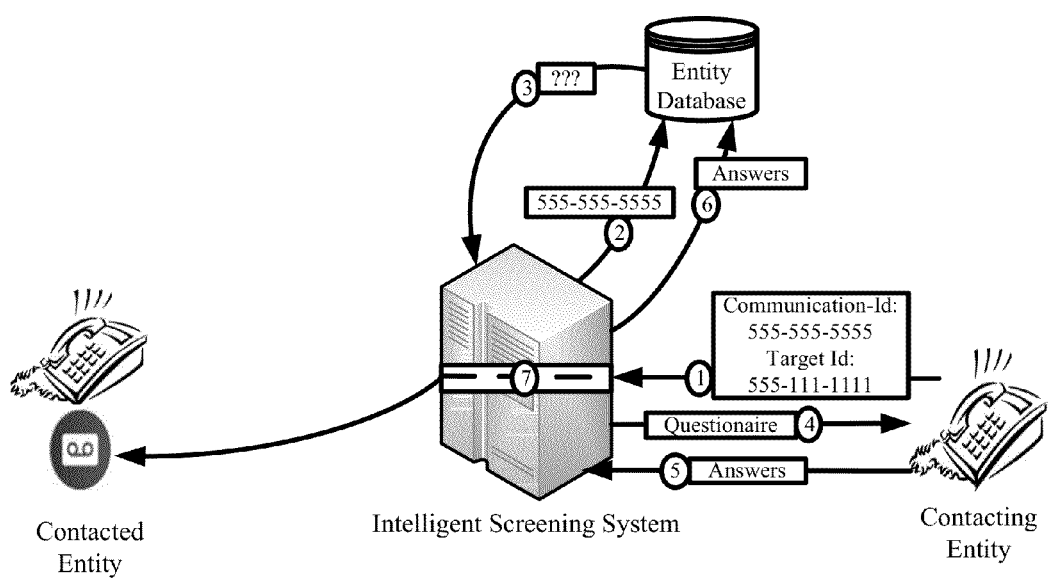
FIG. 9 conceptually illustrates the pre-verification process in accordance with some embodiments.

In some cases, the answers have to be manually processed or verified against secondary sources, thus the system may still be unable to classify the contacting entity after receiving the answers. In such cases, the process provides temporary classification to the contacting entity. This may involve classifying the contacting entity as a potential spammer when the questions are answered or a spammer when the questions are not answered. In cases where the answers are sufficient to accurately classify the contacting entity, the process does so. In any case, the contacting entity is classified (at 880) and the communication is forwarded (at 890) according to any rules that the contacted entity has configured for the contacting entity's classification. The pre-verification process 800 is conceptually illustrated by FIG. 9.

In some instances, the pre-verification process 800 may be intrusive or undesired by some contacted entities. Accordingly, some embodiments provide an alternative post-verification process. In some such embodiments, the contacting entity communication is forwarded to the intended contacted entity and after the communication is complete, the system verifies the contacting entity.

Figure 10:
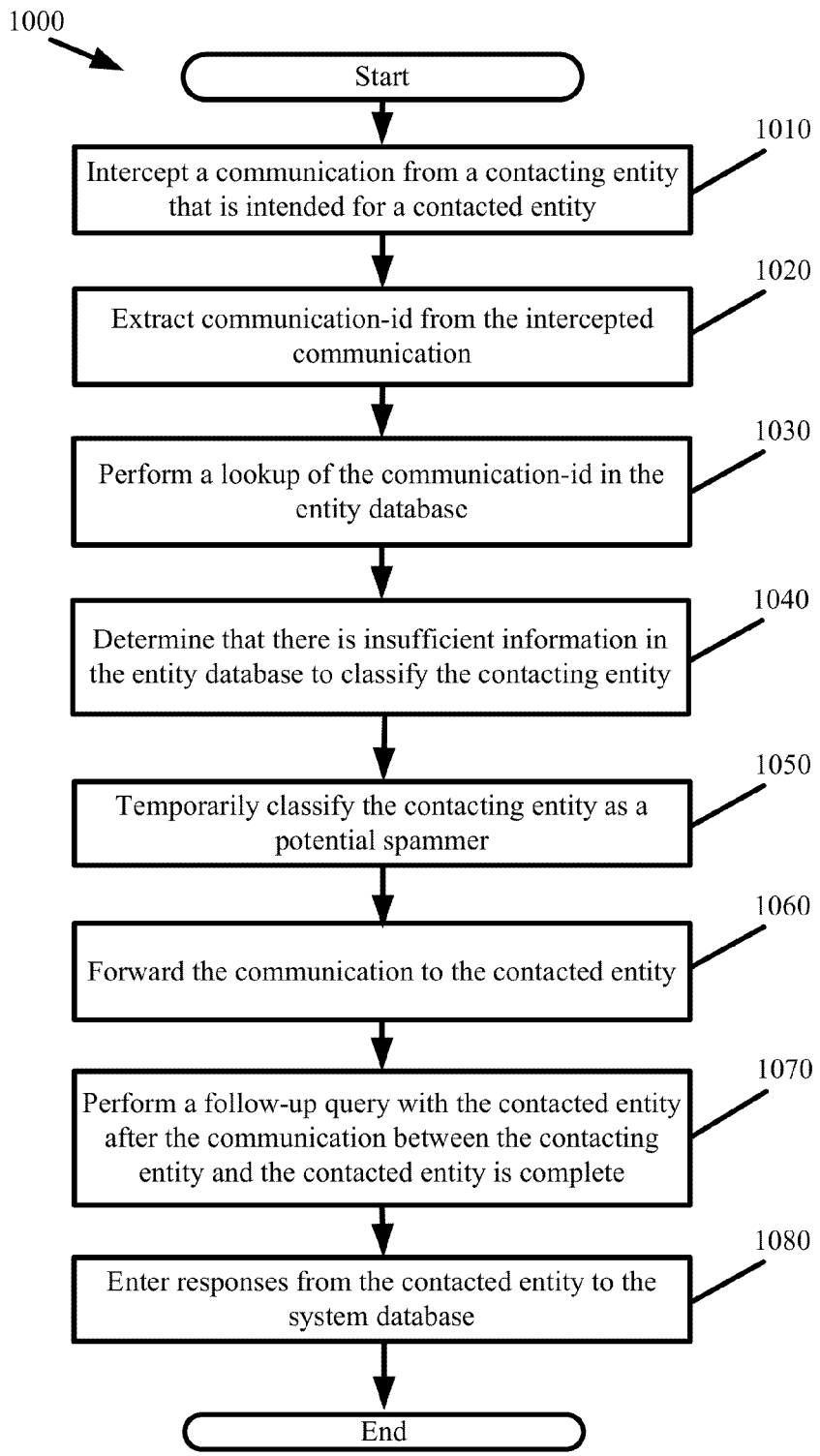
FIG. 10 presents a post-verification process for obtaining classification information on a contacting entity from a contacted entity after a communication between the contacting entity and the contacted entity concludes.

In accordance with some embodiments, FIG. 10 presents a post-verification process 800 for obtaining classification information on a contacting entity from a contacted entity after a communication between the contacting entity and the contacted entity concludes. The process 1000 is performed by the intelligent communication screening system of some embodiments. As with the pre-verification process 800 of FIG. 8, the post-verification process 1000 commences by intercepting (at 1010) a communication that the contacting entity initiates and intends for a contacted entity, extracting (at 1020) the communication-id from the communication, performing (at 1030) a lookup of the communication-id in the entity database, and determining (at 1040) that the entity database does not contain sufficient verified information in order to accurately classify the contacting entity. The process may temporarily provide a classification for the contacting entity. In any event, the process forwards (at 1050) the communication to the contacted entity. The communication may be forwarded with any available information on the contacting entity in order to provide the contacted entity with some identifying information.

After the communication between the contacting entity and the contacted entity concludes, the process performs (at 1060) a follow-up query with the contacted entity. For a telephone communication, the follow-up query is performed once the contacting entity hangs up while the contacted entity remains on the line or sometime after the contacted entity hangs up with a subsequent call to the contacted entity. For an email communication, the follow-up query can be included with the email or in a separate follow-up email. For a text message or SMS communication, the follow-up query may be a follow-up text message or SMS communication asking about the contacted entity.

Figure 11:
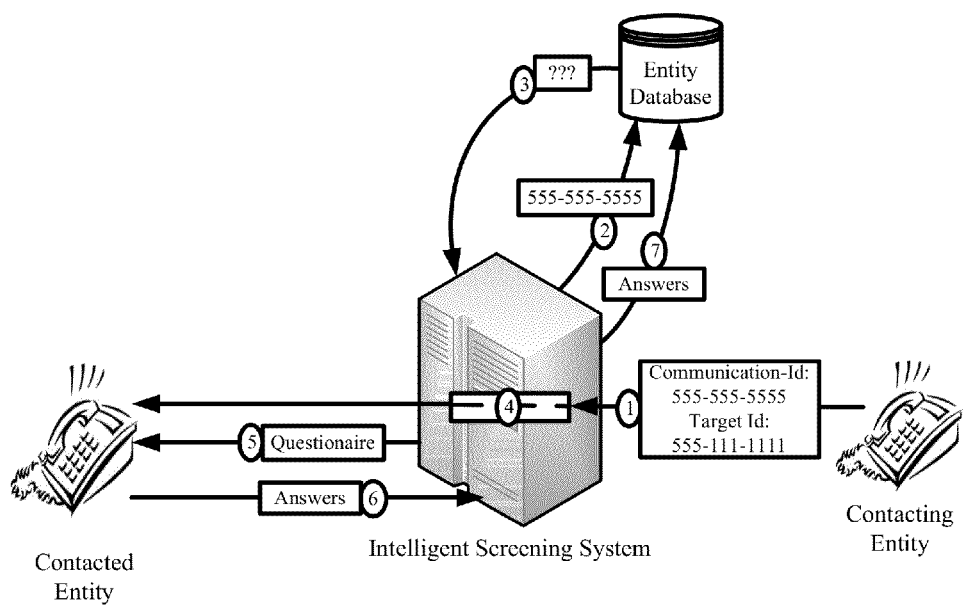
FIG. 11 conceptually illustrates the post-verification process in accordance with some embodiments.

As part of the follow-up query, the process asks the contacted entity various questions regarding the nature of the communication and classification of the contacting entity. The contacted entity's responses are recorded and entered (at 1070) to the system database where they are used to classify the contacting entity for any subsequent communication from the contacting entity. The system may require answers from some threshold number of the contacted entities before locking the contacting entity's classification as a spammer, potential spammer, or non-spammer. In other words, the system may perform the post-verification process multiple times to gather information on the same contacting entity from different contacted entities. The post-verification process 1000 is conceptually illustrated by FIG. 11.

In some embodiments, the system periodically performs the post-verification process 1000 for all contacting entities in order to ensure that the information the system retains on the contacting entities is accurate and up-to-date. In some embodiments, the post-verifying process 1000 is provided as option that contacted entities can elect to perform at the end of any communication. For a particular communication, some embodiments perform both the pre-verification and post-verification of the contacting entity.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Computer and computer system are meant in their broadest sense, and can include any electronic device with a processor including cellular telephones, smartphones, portable digital assistants, tablet devices, laptops, and servers. Examples of computer-readable media include, but are not limited to, CD-ROMs, flash drives, RAM chips, hard drives, EPROMs, etc.

Figure 12:
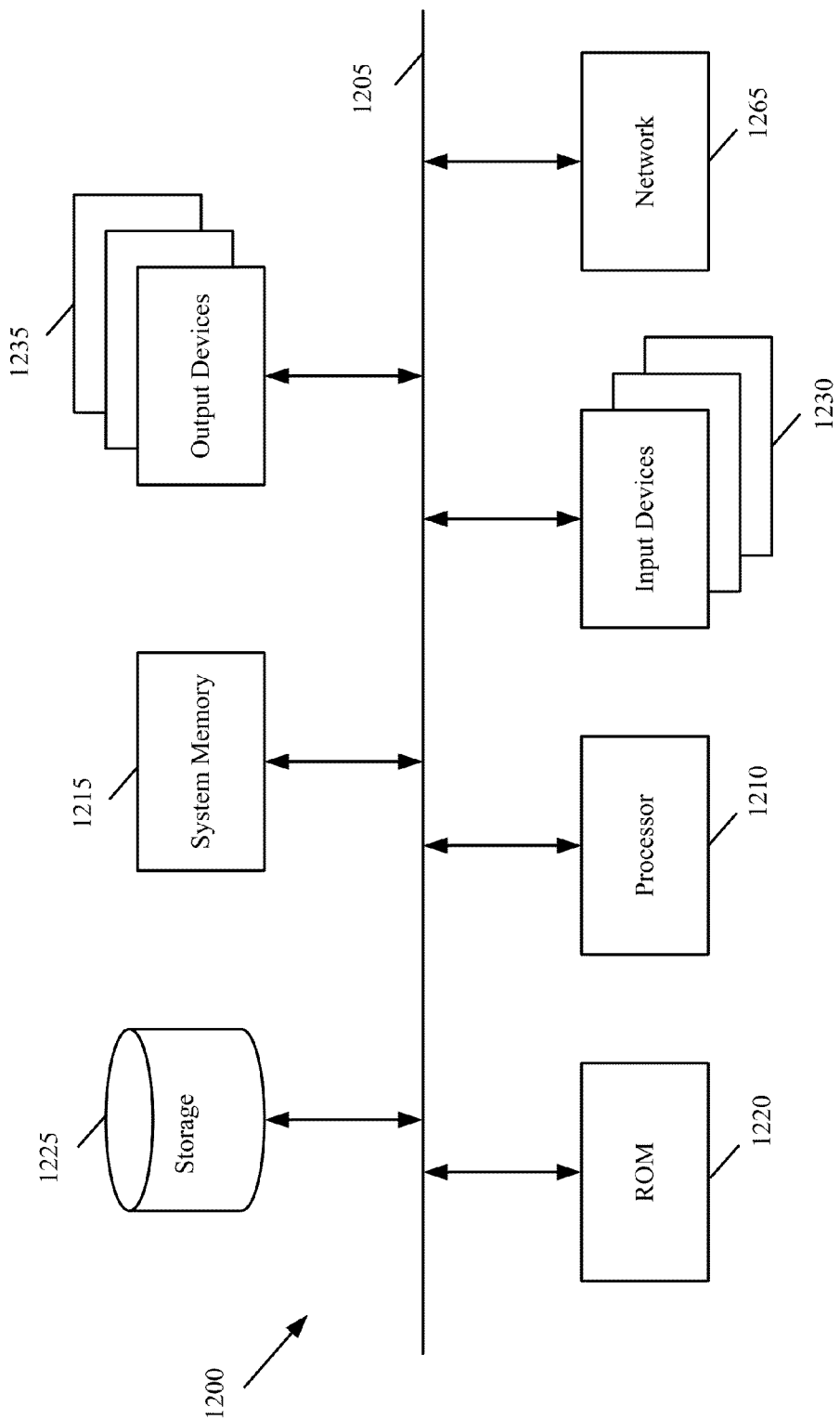
FIG. 12 illustrates a computer system or server with which some embodiments are implemented.

FIG. 12 illustrates a computer system or server with which some embodiments are implemented. Such a computer system includes various types of computer-readable mediums and interfaces for various other types of computer-readable mediums that implement the various processes, modules, and engines described above for the intelligent communication screening system and its components (e.g., registration module, interceptor, lookup module, response module, configuration database, and entity database). Computer system 1200 includes a bus 1205, a processor 1210, a system memory 1215, a read-only memory 1220, a permanent storage device 1225, input devices 1230, and output devices 1235.

The bus 1205 collectively represents all system, peripheral, and chipset buses that communicatively connect the numerous internal devices of the computer system 1200. For instance, the bus 1205 communicatively connects the processor 1210 with the read-only memory 1220, the system memory 1215, and the permanent storage device 1225. From these various memory units, the processor 1210 retrieves instructions to execute and data to process in order to execute the processes of the invention. The processor 1210 is a processing device such as a central processing unit, integrated circuit, graphical processing unit, etc.

The read-only-memory (ROM) 1220 stores static data and instructions that are needed by the processor 1210 and other modules of the computer system. The permanent storage device 1225, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1225.

Other embodiments use a removable storage device (such as a flash drive) as the permanent storage device. Like the permanent storage device 1225, the system memory 1215 is a read-and-write memory device. However, unlike storage device 1225, the system memory is a volatile read-and-write memory, such as random access memory (RAM). The system memory stores some of the instructions and data that the processor needs at runtime. In some embodiments, the processes are stored in the system memory 1215, the permanent storage device 1225, and/or the read-only memory 1220.

The bus 1205 also connects to the input and output devices 1230 and 1235. The input devices enable the user to communicate information and select commands to the computer system. The input devices 1230 include any of a capacitive touchscreen, resistive touchscreen, any other touchscreen technology, a trackpad that is part of the computing system 1200 or attached as a peripheral, a set of touch sensitive buttons or touch sensitive keys that are used to provide inputs to the computing system 1200, or any other touch sensing hardware that detects multiple touches and that is coupled to the computing system 1200 or is attached as a peripheral. The input device 1230 also include alphanumeric keypads (including physical keyboards and touchscreen keyboards), pointing devices (also called "cursor control devices"). The input devices 1230 also include audio input devices (e.g., microphones, MIDI musical instruments, etc.). The output devices 1235 display images generated by the computer system. The output devices include printers and display devices, such as cathode ray tubes (CRT) or liquid crystal displays (LCD).

Finally, as shown in FIG. 12, bus 1205 also couples computer 1200 to a network 1265 through a network adapter (not shown). In this manner, the computer can be a part of a network of computers (such as a local area network ("LAN"), a wide area network ("WAN"), or an Intranet, or a network of networks, such as the internet. For example, the computer 1200 may be coupled to a web server (network 1265) so that a web browser executing on the computer 1200 can interact with the web server as a user interacts with a GUI that operates in the web browser.

As mentioned above, the computer system 1200 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A computer-implemented method performed by a communication screening system comprising at least one server with a processor and a non-transitory computer-readable medium, the computer-implemented method comprising:

intercepting at the communication screening system, a communication that is intended for delivery to an intended contacted entity;

extracting from the communication, an identifier identifying a contacting entity that originates the communication;

querying an entity database using the identifier, the entity database comprising a plurality of entity profiles, each entity profile of the plurality of entity profiles storing verified identifying and contact information for a different entity;

receiving, responsive to said querying, an entity profile comprising verified identifying and contact information for the contacting entity, wherein information for said entity profile is not provided by the contacted entity and includes at least one of an industry in which the contacting entity operates, a verified street address, a verified telephone number, and a verified online presence of the contacting entity; and screening the communication based on the information from the entity profile, wherein screening the communication comprises performing a first action for the communication in response to determining from the entity profile information that the contacting entity is not a spammer and performing a second action for the communication in response to determining from the entity profile information that the contacting entity is a spammer.

2. The computer-implemented method of claim 1 further comprising classifying the contacting entity as at least one of a spammer and non-spammer based on the information from the profile.

3. The computer-implemented method of claim 2, wherein classifying the contacting entity comprises classifying the contacting entity as a spammer based on information from the entity profile indicating that the contacting entity operates in a first set of industries or occupations and classifying the contacting entity as a non-spammer based on information from the entity profile indicating that the contacting entity operates in a second set of industries or occupations that are different than the first set of industries or occupations.

4. The computer-implemented method of claim 2, wherein classifying the contacting entity comprises classifying the contacting entity as a spammer based on information from the entity profile that indicates credibility of the contacting entity being less than a specified threshold and classifying the contacting entity as a non-spammer based on information from the entity profile that indicates the credibility of the contacting entity being greater than the specified threshold.

5. The computer-implemented method of claim 1, wherein performing the first action comprises forwarding the communication to the intended contacted entity, and wherein performing the second action comprises at least one of (i) preventing delivery of the communication to the intended contacted entity and (ii) directing the communication to a mailbox of the intended contacted entity.

6. The computer-implemented method of claim 1, wherein performing the first action comprises inserting a first whisper with the communication to identify that the contacting entity is not a spammer, wherein performing the second action comprises inserting a second whisper with the communication to identify that the contacting entity is a spammer, and wherein each of the first and second whispers comprise an audible prompt that is played when the communication is established with the contacted entity.

7. The computer-implemented method of claim 1, wherein the identifier is a first identifier, the computer-implemented method further comprising extracting a second identifier identifying the intended contacted entity from the communication.

8. The computer-implemented method of claim 7 further comprising retrieving using the second identifier, a configuration defined by the contacting entity that is stored to the non-transitory computer-readable medium, the configuration identifying (i) the first action to be performed by the system when the contacting entity is determined to not be a spammer and (ii) the second action to be performed by the system when the contacting entity is determined to be a spammer.

9. The computer-implemented method of claim 1, wherein the communication is a telephone call placed by the contacting entity to the contacted entity, and wherein the identifier is the telephone number of the contacting entity.

10. The computer-implemented method of claim 1, wherein screening the communication further comprises performing a third action for the communication in response to determining from the entity profile information that the contacting entity is a potential spammer.

11. A computer-implemented method performed by a communication screening system comprising at least one server with a processor and a non-transitory computer-readable medium, the computer-implemented method comprising:

intercepting a communication at the communication screening system before delivery of the communication to an intended contacted entity;

extracting from the communication, an identifier identifying a contacting entity that originates the communication;

obtaining credibility of the contacting entity using the identifier, said credibility quantifying sentiment expressed from any of a plurality of reviews and a plurality of ratings relating to experiences that others have had with the contacting entity;

screening the communication according to the credibility of the contacting entity, wherein screening the communication comprises performing a first action for the communication when the credibility of the contacting entity is below a specified threshold and performing a second action for the communication when the credibility of the contacting entity is greater than the specified threshold, wherein the first action is different than the second action.

12. The computer-implemented method of claim 11, wherein the credibility is quantified as a credibility score.

13. The computer-implemented method of claim 11 further comprising registering the intended contacted entity for communication screening prior to said intercepting, wherein registering the intended contacted entity comprises specifying a configuration for the intended contacted entity, the configuration defining the first action and the second action to perform based on the credibility of the contacting entity.

14. The computer-implemented method of claim 13, wherein the identifier is a first identifier, the computer-implemented method further comprising extracting a second identifier identifying the intended contacted entity that is the recipient for the communication.

15. The computer-implemented method of claim 14 further comprising obtaining the configuration for the intended contacted entity using the second identifier prior to said screening, and wherein screening the communication further comprises using the configuration to identify the first action to be performed by the screening system when the credibility of the contacting entity is below the specified threshold and to identify the second action to be performed by the screening system when the credibility of the contacting entity is greater than the specified threshold.

16. The computer-implemented method of claim 11, wherein performing the first action comprises forwarding the communication directly to the intended contacted entity, and wherein performing the second action comprises at least one of forwarding the communication to a voicemail of the intended contacted entity and terminating the communication.

17. A computer-implemented method performed by a communication screening system comprising at least one server with a processor and a non-transitory computer-readable medium, the computer-implemented method comprising:

storing a plurality of configurations defined by a plurality of entities to the non-transitory computer-readable medium, wherein a particular configuration defined by a first entity of the plurality of entities specifies a first action for the screening system to perform when a spammer attempts to contact the first entity and a second action for the screening system to perform when a non-spammer attempts to content the first entity, and wherein the particular configuration does not specify an enumerated listing of spammers or non-spammers;

intercepting a communication from a second entity to the first entity, wherein the communication comprises a source identifier used for contacting the second entity and a target identifier used for contacting the first entity;

obtaining, using the source identifier, information identifying the second entity to at least one of a first classification and a second classification;

retrieving the particular configuration for the first entity using the target identifier; and screening the communication by performing the first action specified in the particular configuration when the contacting entity is identified to the first classification and performing the second action specified in the particular configuration when the contacting entity is identified to the second classification.

18. The computer-implemented method of claim 17 further comprising querying a database using the source identifier, the database comprising a plurality of profiles, each profile of the plurality of profiles storing information about a different entity.

* * * * *